US009060296B1

(12) United States Patent
Bertz

(10) Patent No.: US 9,060,296 B1
(45) Date of Patent: Jun. 16, 2015

(54) SYSTEM AND METHOD FOR MAPPING NETWORK CONGESTION IN REAL-TIME

(71) Applicant: Sprint Communications Company L.P., Overland Park, KS (US)

(72) Inventor: Lyle T. Bertz, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 223 days.

(21) Appl. No.: 13/857,989

(22) Filed: Apr. 5, 2013

(51) Int. Cl.
*H04W 28/02* (2009.01)
*H04L 12/801* (2013.01)

(52) U.S. Cl.
CPC ...... *H04W 28/0284* (2013.01); *H04W 28/0289* (2013.01); *H04L 47/10* (2013.01)

(58) Field of Classification Search
CPC ................................................ H04W 28/0289
USPC ................. 370/230, 233, 235, 329, 392, 465; 455/418
See application file for complete search history.

(56) References Cited

U.S. PATENT DOCUMENTS

| | | | |
|---|---|---|---|
| 5,042,027 A | 8/1991 | Takase et al. | |
| 5,381,546 A | 1/1995 | Servi et al. | |
| 5,673,256 A | 9/1997 | Maine | |
| 5,796,952 A | 8/1998 | Davis et al. | |
| 6,219,712 B1 | 4/2001 | Mann et al. | |
| 6,385,168 B1 | 5/2002 | Davis et al. | |
| 6,473,622 B1 | 10/2002 | Meuronen | |
| 6,477,180 B1 | 11/2002 | Aggarwal et al. | |
| 6,567,855 B1 | 5/2003 | Tubbs et al. | |
| 6,781,991 B1 | 8/2004 | Anderlind | |
| 7,263,065 B1 | 8/2007 | Cahn | |
| 7,693,731 B1 * | 4/2010 | Weber et al. | ...................... 705/4 |
| 7,852,849 B2 | 12/2010 | Davidson et al. | |
| 8,065,424 B2 | 11/2011 | Foresti et al. | |
| 8,271,336 B2 | 9/2012 | Mikurak | |
| 8,321,515 B1 | 11/2012 | Gailloux et al. | |
| 8,402,543 B1 | 3/2013 | Ranjan et al. | |
| 8,626,860 B1 | 1/2014 | Gailloux et al. | |
| 8,738,333 B1 | 5/2014 | Behera et al. | |
| 8,762,298 B1 | 6/2014 | Ranjan et al. | |
| 8,831,998 B1 | 9/2014 | Cramer et al. | |
| 8,954,588 B1 | 2/2015 | Bertz et al. | |
| 9,015,068 B1 | 4/2015 | Bertz et al. | |
| 2002/0091569 A1 | 7/2002 | Kitaura et al. | |

(Continued)

FOREIGN PATENT DOCUMENTS

WO 2011025433 A1 3/2011

OTHER PUBLICATIONS

Pre-Interview Communication dated Jan. 27, 2012, U.S. Appl. No. 12/428,276, filed Apr. 22, 2009.

(Continued)

*Primary Examiner* — Andrew Lai
*Assistant Examiner* — Andrew C Lee

(57) ABSTRACT

An IP endpoint comprising a processor; a memory; and an application stored in the memory that, when executed by the processor receives from a mobile communications device a mobile device report indicating congestion experienced by data transmitted by the mobile communications device during an interval, receives from a network element an element report indicating congestion experienced by data transmitted by the network element during another interval, and generates a congestion model based on the mobile device report and the element report.

16 Claims, 8 Drawing Sheets

(56) References Cited

U.S. PATENT DOCUMENTS

| | | |
|---|---|---|
| 2002/0156911 A1 | 10/2002 | Croman et al. |
| 2002/0181503 A1 | 12/2002 | Montgomery, Jr. |
| 2002/0194361 A1 | 12/2002 | Itoh et al. |
| 2003/0028640 A1 | 2/2003 | Malik |
| 2003/0065724 A1 | 4/2003 | Clark |
| 2003/0172163 A1 | 9/2003 | Fujita et al. |
| 2003/0237002 A1 | 12/2003 | Oishi et al. |
| 2004/0158840 A1 | 8/2004 | Rothman et al. |
| 2004/0233844 A1 | 11/2004 | Yu et al. |
| 2005/0052994 A1 | 3/2005 | Lee |
| 2005/0091505 A1 | 4/2005 | Riley et al. |
| 2006/0190605 A1 | 8/2006 | Franz et al. |
| 2006/0277307 A1 | 12/2006 | Bernardin et al. |
| 2007/0011061 A1 | 1/2007 | East |
| 2007/0038648 A1 | 2/2007 | Chetwood et al. |
| 2007/0078988 A1 | 4/2007 | Miloushev et al. |
| 2007/0293235 A1* | 12/2007 | Inayoshi et al. .............. 455/455 |
| 2008/0082678 A1 | 4/2008 | Lorch et al. |
| 2008/0159129 A1 | 7/2008 | Songhurst et al. |
| 2008/0159131 A1 | 7/2008 | Hoeflin et al. |
| 2008/0191816 A1* | 8/2008 | Balachandran et al. .... 333/24 R |
| 2008/0198875 A1 | 8/2008 | Qin et al. |
| 2009/0089449 A1 | 4/2009 | Day |
| 2009/0154348 A1 | 6/2009 | Newman |
| 2010/0198943 A1 | 8/2010 | Harrang et al. |
| 2010/0306353 A1 | 12/2010 | Briscoe et al. |
| 2010/0329118 A1* | 12/2010 | Adams .......................... 370/235 |
| 2011/0138064 A1 | 6/2011 | Rieger et al. |
| 2011/0173090 A1 | 7/2011 | Miller et al. |
| 2011/0276677 A1 | 11/2011 | Osuga et al. |
| 2012/0003983 A1 | 1/2012 | Sherlock et al. |
| 2012/0102202 A1 | 4/2012 | Omar |
| 2012/0147750 A1 | 6/2012 | Pelletier et al. |
| 2012/0259722 A1 | 10/2012 | Mikurak |
| 2013/0021916 A1* | 1/2013 | Zhou et al. .................... 370/241 |
| 2013/0029708 A1* | 1/2013 | Fox et al. ...................... 455/509 |
| 2013/0262264 A1 | 10/2013 | Karstoft |
| 2013/0332456 A1 | 12/2013 | Arkin |
| 2013/0343181 A1* | 12/2013 | Stroud et al. .................. 370/229 |
| 2013/0343207 A1* | 12/2013 | Cook et al. .................... 370/252 |
| 2013/0343390 A1* | 12/2013 | Moriarty et al. .............. 370/392 |
| 2014/0254381 A1 | 9/2014 | Racz et al. |

OTHER PUBLICATIONS

First Action Interview Office Action dated Apr. 20, 2012, U.S. Appl. No. 12/428,276, filed Apr. 22, 2009.

Notice of Allowance dated Jul. 19, 2012, U.S. Appl. No. 12/428,276, filed Apr. 22, 2009.

Pre-Interview Communication dated May 1, 2013, U.S. Appl. No. 13/606,012, filed Sep. 7, 2012.

Notice of Allowance dated Aug. 30, 2013, U.S. Appl. No. 13/606,012, filed Sep. 7, 2012.

Restriction Requirement dated Aug. 14, 2014, U.S. Appl. No. 13/594,777, filed Aug. 25, 2012.

Notice of Allowance dated Dec. 3, 2014, U.S. Appl. No. 13/594,777, filed Aug. 25, 2012.

FAIPP Pre-Interview Communication dated Jul. 17, 2014, U.S. Appl. No. 13/594,778, filed Aug. 25, 2012.

Notice of Allowance dated Sep. 19, 2014, U.S. Appl. No. 13/594,778, filed Aug. 25, 2012.

FAIPP Pre-Interview Communication dated Jul. 17, 2014, U.S. Appl. No. 13/594,779, filed Aug. 25, 2012.

First Action Interview Office Action dated Dec. 3, 2014, U.S. Appl. No. 13/594,779, filed Aug. 25, 2012.

Bertz, Lyle T., et al., Patent Application entitled, "Framework for Real-Time Brokering of Digital Content Delivery," filed Aug. 25, 2012, U.S. Appl. No. 13/594,777.

Bertz, Lyle T., et al., Patent Application entitled, "Reservations in Real-Time Brokering of Digital Content Delivery," filed Aug. 25, 2012, U.S. Appl. No. 13/594,778.

Bertz, Lyle T., et al., Patent Application entitled, "File Retrieval in Real-Time Brokering of Digital Content Delivery," filed Aug. 25, 2012, U.S. Appl. No. 13/594,779.

* cited by examiner

SYSTEM AND METHOD FOR MAPPING NETWORK CONGESTION IN REAL-TIME

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

3GPP has recently reached a milestone for user plane congestion through its user plane congestion working group. As such, it would be beneficial to improve methods of detecting congestion. Previous systems provide means for indicating that congestion has been experienced along a path from a source to an endpoint. However, previous systems fail to indicate which elements are actually experiencing congestion. Moreover, previous systems do not provide information about the pattern or flow of the congestion.

SUMMARY

In some embodiments an IP endpoint is disclosed. The IP endpoint comprises a processor; a memory; and an application stored in the memory that, when executed by the processor receives from a mobile communication device a mobile device report indicating congestion experienced by data transmitted by the mobile device during an interval, receives from a network element an element report indicating congestion experienced by data transmitted by the network element during another interval, and generates a congestion model based on the mobile device report and the element report.

In some embodiments a network element is disclosed. The network element comprises a memory; a processor configured to transmit data from an IP endpoint to a mobile communications device; and at least one application stored in the memory that, when executed by the processor, counts an amount of data transmitted by the network element, and counts amount of the data marked as congestion experienced that is transmitted by the network element.

In some embodiments a method is disclosed. The method comprises receiving, by an IP endpoint, a mobile device report from a mobile communication device indicating congestion experienced by data transmitted by the mobile communication device during an interval, receiving, by the IP endpoint, an element report from a network element indicating congestion experienced by data transmitted by the network element during another interval, and mapping a network congestion model based on the mobile device report and the element report.

BRIEF DESCRIPTION OF THE DRAWINGS

These and other features will be more clearly understood from the following detailed description taken in conjunction with the accompanying drawings and claims.

For a more complete understanding of the present disclosure, reference is now made to the following brief description, taken in connection with the accompanying drawings and detailed description, wherein like reference numerals represent like parts.

DETAILED DESCRIPTION

Figure 1:
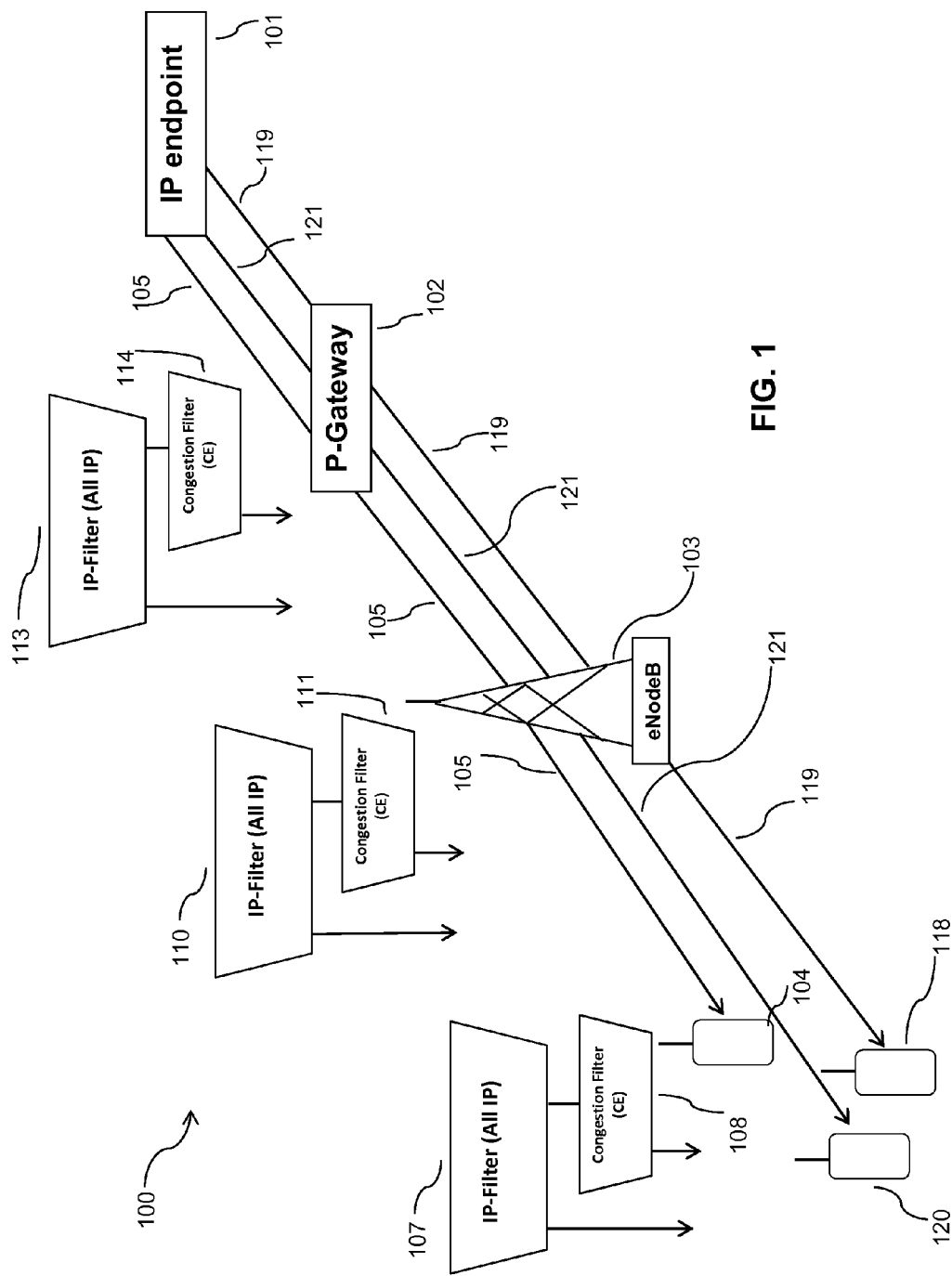
FIG. 1 is a block diagram of a data network comprising a system for mapping network congestion in real-time according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

This disclosure pertains to user data sessions comprising data packets travelling through a data network. Network elements in a data network may undergo congestion when the number of data packets travelling through the element reaches near to the element's capacity. When data packets in a user data session experience congestion while travelling through a network element, the user data session may become interrupted or altogether dropped. In accord, it may be beneficial to divert packets away from any congested network elements and towards network elements that are not experiencing congestion. Therefore, it would be beneficial to provide a system for determining in real-time the extent of congestion at various network elements within a data network. In this disclosure, the term "determining in real-time" may mean determining an event or condition substantially concurrently with an occurrence thereof. For example, "determining in real-time" may mean determining within about 5 seconds or less. Alternatively, "determining in real-time" may mean determining within a different time threshold, for example within about 20 seconds, within about 1 minute, within about 5 minutes, within about 30 minutes. The considerations that bear on the "real-time" aspect is the ability to derive information from current network conditions quickly enough to take action to adapt network communications activities in the context of those current network conditions and in some instances even to anticipate a future state of network conditions. Additionally, in an embodiment, the "real-time" aspect may be related to processing the information asynchronously and shortly after events happen versus accumulating events and processing them at a later time in a batch processing approach.

Prior systems may employ Explicit Congestion Notification (ECN) in order to detect congestion experienced by a user device. Explicit Congestion Notification sets out to indicate congestion within a data network by tagging individual packets. ECN is based on a recognition that if a network element is capable of experiencing congestion, then the network element is also capable of determining when it is almost congested and at what point it will become congested. For example, a network element can recognize when it is 70% full and how many more packets will make it through the network element before the network element reaches capacity and begins dropping remaining packets. Thus, the network element that is 70% full can determine that the additional number of packets that will travel through the network element before the network element reaches capacity equals 30% of the network element's full packet capacity. Since the network element has determined it is 70% full, it can also recognize that this remaining 30% of capacity will experience congestion as they travel through the network element. Hence, the network element may mark this remaining 30% of packets to indicate Congestion Experienced (CE).

The network element may mark the packets by using 2 bits in each packet's IP header. For example, a packet marked "11" can indicate that the network element is experiencing congestion.

In Open System Interconnection (OSI) Layer 4 protocols, ECN features exist that return downstream Congestion Experienced (CE) information to the sender. However, while prior systems may employ Explicit Congestion Notification functionality, they employ it only at the Rule Level and/or Session Level for a mobile communications device. Hence, prior IP endpoints are capable only of detecting whether or not a packet experienced congestion while travelling from a source to an endpoint; they are not capable of detecting where in the network (e.g., at which network element) the packet experienced congestion. Therefore, it would be useful to provide a means for isolating congestion within a data network.

Disclosed is a method and system for mapping network congestion in real-time. The system may comprise means for enabling an IP endpoint to determine which particular network element(s) are undergoing congestion. The disclosed system involves an extension of Explicit Congestion Notification functionality, which was previously employed only at the Rule Level and/or Session Level. More particularly, the disclosed system comprises an application of Explicit Congestion Notification functionality to the Access Point Name (APN) Level and/or to the Packet or Policy Control Enforcement Function and Enforcement Point (PCEF) Level. Hence, a solution is disclosed that allows near real-time detection and isolation of network congestion.

The disclosed system comprises ECN functionality on the APN Level and/or the PCEF Level. APN and/or PCEF network components standing between an IP endpoint and at least one mobile communication device may be configured to generate and send congestion reports to the IP endpoint. The congestion reports may be based on the number of packets transmitted by network components that are marked as Congestion Experienced. The reports may include a ratio of a number of packets transmitted by a network component that are marked as Congestion Experienced, to the total number of packets transmitted by the network component. Hence, the reports may indicate the extent of congestion within each network component. The APN Level and/or PCEF Level (e.g., element level) may span multiple data sessions, and thus reports sent to the IP endpoint by the APN and/or PCEF components may indicate congestion throughout the network and spanning multiple data sessions. In turn, the IP endpoint may analyze the reports to obtain a large-scale view of congestion within the network. For example, the IP endpoint may analyze the ratios in the reports to determine which network components are experiencing more congestion and which network components are experiencing less congestion compared to other components in the network. Therefore, the IP endpoint may reroute data packets away from more congested components and towards less congested components. The ratios indicated in the reports enable the IP endpoint to analyze the reports in a highly efficient manner. Therefore, the disclosed system provides a means for accurately modeling congestion within a network in real-time.

This disclosure introduces application of Explicit Congestion Notification on at least the APN Level as well as the PCEF Level. Thus, while the following description focuses on the application of Explicit Congestion Notification on the PCEF level, the description is exemplary and it is to be understood that this disclosure also applies to application of Explicit Congestion Notification on the APN level.

Turning now to FIG. 1, disclosed is a data network 100 implementing a system for mapping network congestion in real-time. The data network 100 comprises an IP endpoint 101, a P-Gateway (P-GW) 102, an enhanced node-B (eNodeB) 103, a reporting mobile communications device 104, and two secondary mobile communications devices 118, 120. Those skilled in the art will realize that the description of an IP endpoint 101 associated with one P-Gateway 102, one enhanced node-B 103, and three mobile communications devices 104, 118, 120 is illustrative and the data network 100 may comprise any number of IP endpoints 101 communicatively coupled to any number of P-Gateways 102, any number of enhanced node-B's 103, and any number of mobile communications devices 104, 118, 120. Also, it should also be apparent to one skilled in the art that the network elements need not comprise an enhanced node-B and a P-Gateway, but rather, the network elements can comprise any network elements standing between a mobile communications device and an IP endpoint. Moreover, the data network 100 may comprise various other network elements in addition to a P-Gateway and/or an enhanced node-B, for example, at least one small cell (e.g., femtocell, picocell, and/or microcells). It will be appreciated that in the employment of the disclosed system for mapping network congestion in real-time, small cells are treated as enhanced node-Bs 103. It should further be apparent to one skilled in the art that the P-Gateway 102 can comprise an S-Gateway rather than a P-Gateway.

Arrow 105 represents a data session comprising packets (e.g., a data packet) travelling, via a corresponding to a wireless communication link, from the IP endpoint 101 to the reporting mobile communications device 104. As seen from FIG. 1, the packets travel through the P-Gateway 102 and through the enhanced node-B 103 during the data session 105. Arrow 119 represents a data session comprising packets travelling from the IP endpoint 101 to a secondary mobile communications device 118. Arrow 121 represents a data session comprising packets travelling from the IP endpoint 101 to another secondary mobile communications device 120.

While FIG. 1 illustrates the packets traveling through one P-Gateway 102 and one enhanced node-B 103 during their routes 105, 119, 121, it will be apparent to those skilled in the art that the packets may travel through any number of network elements (e.g., 102, 103) between the IP endpoint 101 and the mobile communications device 104, 118, 120.

The disclosed system may comprise a pair of P-Gateway filters 113, 114 located at the P-Gateway 102. The pair of P-Gateway filters 112 may comprise at least one software application executing on a computer within the P-Gateway 102. The pair of P-Gateway (P-GW) filters 113, 114 may comprise a P-GW IP filter 113, which counts the total number of IP bytes transmitted by the P-Gateway 102. The pair of P-Gateway filters 113, 114 may also comprise a P-GW congestion filter 114, which counts the number of bytes transmitted by the P-Gateway that are marked as congestion experienced (CE). Bytes are marked as congestion experienced (CE) when they travel in a packet with a header indicating congestion experienced. The packet header may indicate congestion experienced if bits in the DiffServField of IPv4 or IPv6 headers are marked "1 1". Thus, the P-Gateway congestion filter may detect a packet comprising the "1 1" congestion experienced marking in the IP header, count the number of bytes in the marked packet, and keep track of the total number of bytes counted during an interval. The DiffServField may be referred to as a type of service (ToS) byte in IPv4 headers and as a TrafficClass byte in IPv6 headers.

The disclosed system may also comprise a pair of eNodeB filters 110, 111 located at the enhanced node-B 103. The pair of eNodeB filters 109 may comprise at least one software application executing on a computer in the enhanced node-B 103. The pair of eNodeB filters 110, 111 may comprise an eNodeB IP filter 110, which counts the total number of IP bytes transmitted by the enhanced node-B 103. The pair of eNodeB filters 110, 111 may also comprise an eNodeB congestion filter 111, which counts the number of bytes transmitted by the eNodeB that are marked as congestion experienced (CE). Bytes are marked as congestion experienced (CE) when they travel in a packet with a header indicating congestion experienced. The packet header may indicate congestion experienced if bits in the DiffServField of IPv4 or IPv6 headers are marked "1 1". Thus, the eNodeB congestion filter may detect a packet comprising the "1 1" congestion experienced marking in the IP header, count the number of bytes in the marked packet, and keep track of the total number of bytes counted during an interval.

The disclosed system may also comprise a pair of mobile device filters 106 located at the reporting mobile device 104. The pair of mobile device filters 106 may comprise at least one software application executing on a computer in the mobile device 104. The pair of mobile device filters 106 may comprise a mobile device IP filter 107, which counts the total number of IP bytes transmitted by mobile device 104. The pair of mobile device filters 106 may also comprise mobile device congestion filter 108, which counts the number of bytes transmitted by mobile device 104 that are marked as congestion experienced (CE). Bytes are marked as congestion experienced (CE) when they travel in a packet with a header indicating congestion experienced. The packet header may indicate congestion experienced if bits in the DiffServField of IPv4 or IPv6 headers are marked "1 1". Thus, the mobile device congestion filter may detect a packet comprising the "1 1" congestion experienced marking in the IP header, count the number of bytes in the marked packet, and keep track of the total number of bytes counted during an interval.

An element may be "congested" when the number of packets within its queue comprises a predetermined percentage of the element's full capacity. The predetermined percentage of full capacity may be set by a communications service provider exercising control over the element. For example, in an embodiment, a communications service provider may set an element to deem "congestion" as 70% of full capacity. In such a case, upon the element determining it is 70% full, the element will mark the packets as experiencing congestion. In another embodiment, the communications service provider may set the element to deem "congestion" as 90% of full capacity. In such a case, the element will mark packets as experiencing congestion upon the element determining it is 90% full.

The element may comprise a computer for executing software configured to determine whether or not the element is experiencing congestion. The communications service provider may program the software according to how the user has chosen to define "congestion." Thus, in a communication network comprising multiple elements controlled by the communications service provider, the provider may set a first element to deem "congestion" as a first percentage of full capacity while setting a second element to deem "congestion" as a second percentage of full capacity (e.g., set the first element to begin marking packets as congestion experienced upon the element reaching 70% of full capacity, and set the second element to begin marking packets as congestion experienced upon the element reaching 90% of full capacity).

An interval may be packet-based, byte-based, time-based, or may be based on any other type of interval methodology. In a packet-based interval methodology, a processor in an element (e.g., a P-Gateway 102, enhanced node-B 103, mobile device 104) counts the number of packets transmitted by the element. The interval may begin when zero packets have been transmitted by the element and the interval may end when a predetermined number of packets have been transmitted by the element. Once the predetermined number of packets have been transmitted by the element, the interval ends.

In a byte-based interval methodology, a network element (e.g., a P-Gateway 102, enhanced node-B 103, mobile device 104) counts the number of bytes transmitted by the network element. The interval may begin when zero bytes have been transmitted by the network element and the interval may end when a predetermined number of bytes have been transmitted by the network element. Once the predetermined number of bytes have been transmitted by the network element, the interval ends.

In a time-based based interval methodology, an element (e.g., a P-Gateway 102, enhanced node-B 103, mobile device 104) counts the amount of time that accrues. The interval may begin at zero and the interval may end when a predetermined number of time has accrued. Once the network element has counted a predetermined amount of time, the interval ends. Each of the elements (e.g., 102, 103, 104) may comprise a processor for carrying out the actions disclosed herein.

In a network comprising multiple elements, each element may employ an interval methodology independently of the other elements. For example, a first element may utilize a type of interval methodology while a second element utilizes another type of interval methodology. The first type of interval methodology may be the same as or different than the second type of interval methodology. In some cases, a first element and second element employ similar interval methodologies. In such cases, the first element may utilize a first interval while the second element utilizes a second interval. For example, the first element may use a packet-based interval methodology that terminates when "x" number of packets have been transmitted, while the second element uses a packet-based interval methodology that terminates when "y" number of packets have been transmitted. The values of "x" and "y" may be the same values or may be different values.

Because the elements may employ various interval methodologies and/or may be based on different intervals, the elements do not require tedious efforts associated with programming and synchronization. This permitted variation among elements is due to the fact that the element reports are generated in ratio form, which is described below in the discussion of FIG. 2.

Figure 2:
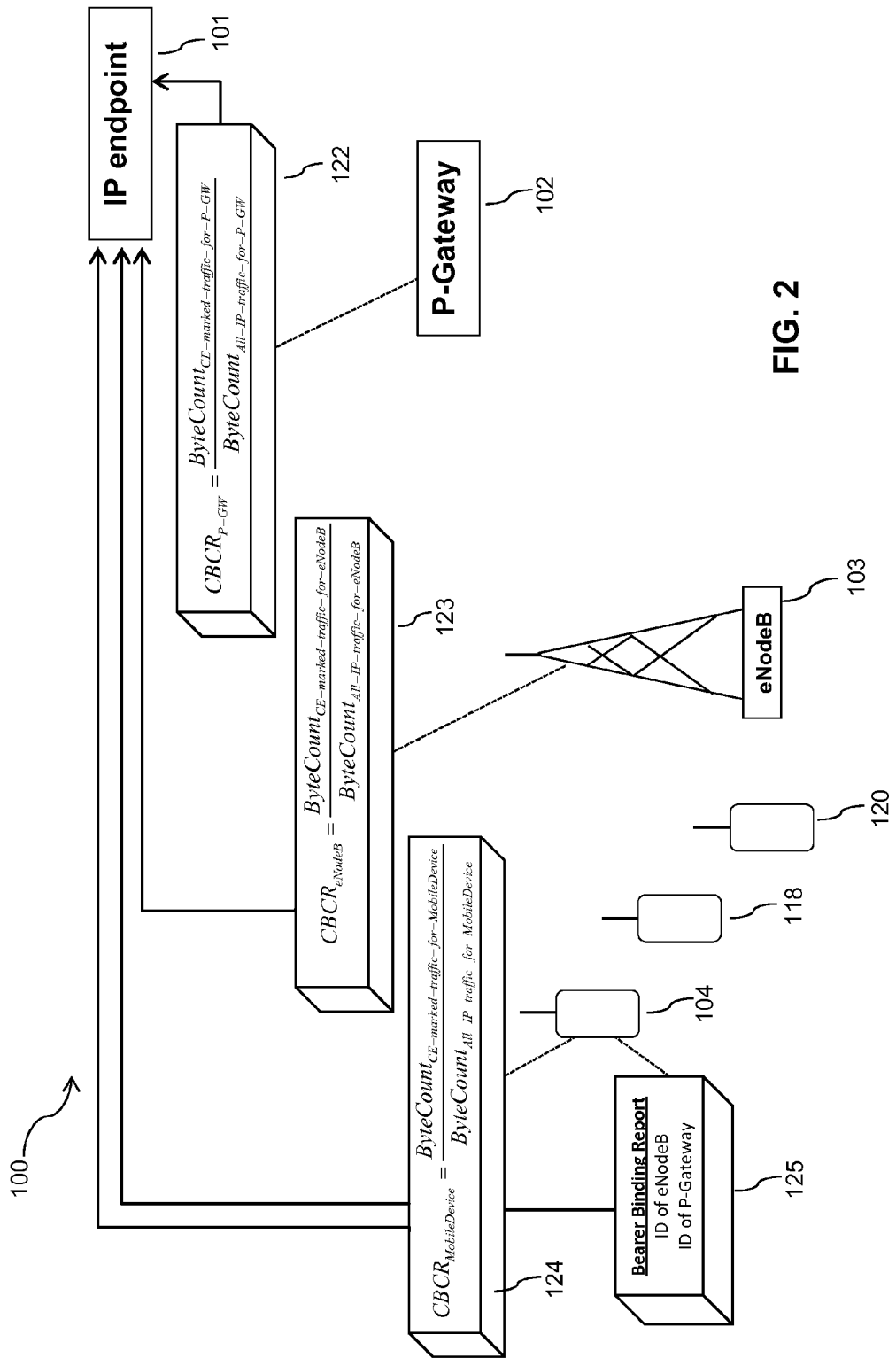
FIG. 2 is a block diagram of a data network comprising a system for mapping network congestion in real-time according to an embodiment of the disclosure.

Now turning to FIG. 2, upon the P-Gateway 102 detecting the beginning of an interval, the pair of P-GW filters 113, 114 may begin counting the interval (e.g., begin counting the number of packets, number of bytes, amount of time accruing, etc.). For example, if the P-Gateway employs a byte-based interval methodology, the P-GW IP filter 113 may begin counting all of the bytes transmitted by the P-Gateway 102, while the P-GW congestion filter 114 may begin counting all of the bytes transmitted by the P-Gateway 102 that are marked as congestion experienced. The P-GW IP filter 113 may continue counting all of the bytes transmitted by the P-Gateway 102 until it determines the end of the interval. Likewise, the P-GW congestion filter 114 may continue counting all of the congestion experienced marked bytes transmitted by the P-Gateway 102 until it determines the end of the interval. Upon the end of the interval, the P-GW IP filter 112 may determine the total number of bytes that been transmitted by the P-Gateway 102 during the course of the interval, which is referred to as ByteCount$_{All-IP-Traffic-for-P-GW}$ in this disclosure. Also, upon the end of the interval, the P-GW congestion filter 114 may determine the number of bytes experiencing congestion that been transmitted by the P-Gateway 102 during the course of the interval, which is referred to as ByteCount$_{CE-marked-traffic-for-P-GW}$ in this disclosure. The P-Gateway 102 may then determine the ratio of the total number of congestion experienced marked bytes that been transmitted by the P-Gateway 102 during the course of the interval ByteCount$_{CE-marked-traffic-for-P-GW}$ to the total number of bytes that been transmitted by the P-Gateway 102 during the course of the interval ByteCount$_{All-IP-Traffic-for-P-GW}$ to determine a P-GW Congestion Byte Count Ratio (CBCR). Thus, the P-Gateway Congestion Byte Count Ratio can be represented as:

$$CBCR_{P-GW} = \frac{ByteCount_{CE-marked-traffic-for-P-GW}}{ByteCount_{All-IP-Traffic-for-P-GW}}$$

and wherein ByteCount$_{CE-marked-traffic-for-P-GW}$ is the number of bytes experiencing congestion transmitted by the P-Gateway 102 during the interval and ByteCount$_{All-IP-Traffic-for-P-GW}$ is the total number of bytes transmitted by the P-Gateway 102 during the interval.

Upon the termination of the interval, the P-Gateway may produce a P-Gateway report 122 indicating the calculated P-Gateway Congestion Byte Count Ratio. The P-Gateway 102 may then send the P-Gateway report 122 to the IP endpoint 101.

Upon the enhanced node-B 103 detecting the beginning of an interval, the pair of eNodeB filters 110, 111 may begin counting. For example, the eNodeB IP filter 110 may begin counting all of the bytes transmitted by the enhanced node-B 103, while the eNodeB congestion filter 111 may begin counting all of the bytes transmitted by the enhanced node-B 103 that are marked as congestion experienced. The eNodeB IP filter 110 may continue counting all of the bytes transmitted by the enhanced node-B 103 until it determines the end of the interval. Likewise, the eNodeB congestion filter may continue counting all of the congestion experienced marked bytes transmitted by the enhanced node-B 103 until it determines the end of the interval. Upon the end of the interval, the eNodeB IP filter 109 may determine the total number of bytes that were transmitted by the enhanced node-B 103 during the course of the interval, which is referred to as ByteCount$_{All-IP-Traffic-for-eNodeB}$ in this disclosure. Also, upon the end of the interval, the eNodeB congestion filter 111 may determine the number of bytes experiencing congestion that were transmitted by the enhanced node-B 103 during the course of the interval, which is referred to as ByteCount$_{CE-marked-traffic-for-eNodeB}$ in this disclosure. The enhanced node-B 103 may then determine the ratio of the total number of congestion experienced marked bytes transmitted by the enhanced node-B 103 during the course of the interval ByteCount$_{CE-marked-traffic-for-eNodeB}$ to the total number of bytes transmitted by the enhanced node-B 103 during the course of the interval ByteCount$_{All-IP-Traffic-for-eNodeB}$ to determine an eNodeB Congestion Byte Count Ratio (CBCR). Thus, the eNodeB Congestion Byte Count Ratio can be represented as:

$$CBCR_{eNodeB} = \frac{ByteCount_{CE-marked-traffic-for-eNodeB}}{ByteCount_{All-IP-Traffic-for-eNodeB}}$$

and wherein ByteCount$_{CE-marked-traffic-for-eNodeB}$ is the number of bytes experiencing congestion transmitted by the enhanced node-B 103 during the interval and ByteCount$_{All-IP-Traffic-for-eNodeB}$ is the total number of bytes transmitted by the enhanced node-B 103 during the interval.

Upon the termination of the interval, the eNodeB may produce an eNodeB report 123, indicating the calculated eNodeB Congestion Byte Count Ratio. The enhanced node-B 103 may then send the eNodeB report 123 to the IP endpoint 101.

Upon the reporting mobile device 104 detecting the beginning of an interval, the pair of mobile device filters 106 may begin counting. For example, the mobile device IP filter 107 may begin counting all of the bytes transmitted by the reporting mobile device 104, while the mobile device congestion filter 108 may begin counting all of the bytes transmitted by the reporting mobile device 104 that are marked as congestion experienced. The mobile device IP filter 107 may continue counting all of the bytes transmitted by the reporting mobile device 104 until it determines the end of the interval. Likewise, the mobile device congestion filter 108 may continue counting all of the congestion experienced marked bytes transmitted by the reporting mobile device 104 until it determines the end of the interval. Upon the end of the interval, the mobile device IP filter 107 may determine the total number of bytes transmitted by the reporting mobile device 104 during the course of the interval, which is referred to as ByteCount$_{All-IP-Traffic-for-mobile-device}$ in this disclosure. Also, upon the end of the interval, the mobile device congestion filter 108 may determine the number of bytes experiencing congestion transmitted by the reporting mobile device 104 during the course of the interval, which is referred to as ByteCount$_{CE-marked-traffic-for-mobile-device}$ in this disclosure. The reporting mobile device 104 may then determine the ratio of the total number of congestion experienced marked bytes transmitted by the reporting mobile device 104 during the course of the interval ByteCount$_{CE-marked-traffic-for-mobile-device}$ to the total number of bytes transmitted by the reporting mobile device 104 during the course of the interval ByteCount$_{All-IP-Traffic-for-mobile-device}$ to determine a mobile device Congestion Byte Count Ratio (CBCR). Thus, the mobile device Congestion Byte Count Ratio can be represented as:

$$CBCR_{MobileDevice} = \frac{ByteCount_{CE-marked-traffic-for-mobile-device}}{ByteCount_{All-IP-Traffic-for-mobile-devive}}$$

and wherein ByteCount$_{marked-traffic-for-UE}$ is the number of bytes experiencing congestion transmitted by the reporting mobile device 104 during the interval and Byte-Count$_{All-IP-Traffic-for-mobile-device}$ is the total number of bytes transmitted by the reporting mobile device 104 during the interval.

Upon the termination of the interval, the reporting mobile device may produce a Mobile Device Report 124, indicating the calculated mobile device Congestion Byte Count Ratio. The reporting mobile device 104 may then send the Mobile Device Report 124 to the IP endpoint 101.

The IP endpoint 101 may receive a Bearer Binding Report 125 from a mobile device (104, 118, 120). FIG. 2 illustrates a preferred embodiment wherein the Bearer Binding Report 125 is generated and sent by the reporting mobile device 104 (e.g., by a mobile device that sends a mobile device CBCR Report 124), however, in other embodiments the Bearer Binding Report 125 may be generated and sent to the IP endpoint by a mobile device (104, 118, 120) that does not send a CBCR Report. The Bearer Binding Report 125 may indicate the identities of the network elements (102, 103) between the mobile device 104, 118, 120 and the IP endpoint 101 communicating in the data session 105.

As shown in FIG. 2, while secondary mobile devices 118, 120 participate in data sessions with the IP endpoint 101 via the enhanced node-B 103 and the P-Gateway 102, these secondary mobile devices 118, 120 may refrain from sending a CBCR Report to the IP endpoint 101. Rather, CBCR Reports may be transmitted by all of the network elements (e.g., P-Gateways 102, eNodeBs 103) and by less than all of the mobile devices 104, 118, 120 communicating with the network elements 102, 103. For example, a CBCR report 125 may be generated and sent by the reporting mobile device 104 but not from the secondary mobile devices 118, 120. When less than all of the mobile devices (104, 118, 120) send a CBCR Report to the IP endpoint 101, simplicity is improved. For example, if the IP endpoint 101 were to receive a CBCR Report from every network element 102, 103 and from every mobile device 104, 118, 120 within the data network 100, such would be impractical and demanding on resources. Moreover, the method of evaluating by an IP endpoint 101 CBCR Reports from multiple network elements (102, 103) and from a single reporting mobile device 104 brings about highly valuable congestion modeling capabilities, which are described in detail below.

In an embodiment, the network congestion modeling and mapping capabilities described herein may be advantageously used in real-time brokering of digital content delivery. For further details about real-time brokering of digital content delivery, see U.S. patent application Ser. No. 13/594,777, filed Aug. 25, 2012, entitled "Framework for Real-time Brokering of Digital Content Delivery," by Lyle T. Bertz, et al.; U.S. patent application Ser. No. 13/594,778, filed Aug. 25, 2012, entitled "Reservations in Real-time Brokering of Digital Content Delivery," by Lyle T. Bertz, et al.; and U.S. patent application Ser. No. 13/594,779, filed Aug. 25, 2012, entitled "File Retrieval in Real-time Brokering of Digital Content Delivery," by Lyle T. Bertz, et al., each of which is hereby incorporated herein by reference in its entirety.

Through evaluating the CBCR report 124 from the reporting mobile communications device 104 and the CBCR reports 122, 123 from the network elements 102, 103, and through identifying the network components 102, 103 via the received Bearer Binding Report 125, the IP endpoint 101 may make an informed assessment of the congestion within the network 101. For example, based on the reports, the IP endpoint 101 may generate various ratios and comparisons indicative of network congestion in real-time. Because the IP endpoint 101 receives CBCR Reports 122, 123, 124 comprising ratios (rather than raw data reports) the volume of data accrued by the IP endpoint 101 is reduced. Thus, the IP endpoint 101 may store numerous CBCR Reports 122, 123, 124 in memory.

Moreover, the method of generating and sending CBCR Reports 122, 123, 124 to the IP endpoint 101 enables the IP endpoint 101 to accurately analyze the congestion within a network 100 in real-time. For example, the consistent ratio format among the CBCR reports 122, 123, 124 eliminates the need to normalize the congestion data. For example, if the enhanced node-B 103 utilizes a first type of interval methodology while the P-Gateway 102 utilizes a second type of interval methodology, the discrepancy will not affect the ability of the IP endpoint 101 to compare the eNodeB CBCR 123 to the P-Gateway CBCR 122, since the CBCRs 122, 123 are in similar ratio form. Also, the use of ratios is based on the appreciation for the fact that analysis of network congestion primarily concerns the accumulation of and direction of the congestion, rather than intricate details about specific interactions. For example, for purposes of congestion analysis, importance lies in the extent of an element's congestion (e.g., how close the element is to reaching full capacity), rather than the actual amount of data packets within the element's queue. Hence, CBCR reports 122, 123, 124 informing the IP endpoint 101 of which network elements 102, 103 are experiencing congestion and where the network elements are located in relation to the other elements in the data network 100 (e.g., information provided in the Bearer Binding Report 125) as well as CBCR reports 122, 123, 124 informing the IP endpoint 101 about the severity of the congestion at each network element 102, 103 enables the IP endpoint 101 to evaluate and compare the CBCR reports 122, 123, 124 so as to isolate the location and direction of congestion. Moreover, because the ratio format provides simplicity, the isolation and evaluation may be achieved with less processing power and in real-time.

The ratios and comparisons may allow the IP endpoint 101 to draw various inferences regarding the congestion within the network. For example, the IP endpoint 101 may evaluate the CBCR report 124 for a mobile communications device 104 and the CBCR reports 122, 123 for network elements 102, 103 communicating with the mobile communications device 104. The IP endpoint 101 may determine that a particular network element 102, 103 is communicating with a mobile communications device 104 based on a Bearer Binding Report 125 sent by the mobile communications device. The IP endpoint 101 may also analyze CBCR data for multiple network elements 102, 103 communicating with a mobile communications device 104 and draw inferences based on the relationship among the various CBCR values. In one embodiment, an IP endpoint 101 can analyze for a particular interval: the CBCR of a mobile communications device 104 ($CBCR_{mobile-device}$), the CBCR of an enhanced node-B 103 ($CBCR_{eNb}$), and the CBCR of a P-Gateway 102 ($CBCR_{P-GW}$). The IP endpoint 101 can compare to the value of 1 in relation to the ratio of $CBCR_{mobile-device}$ to $CBCRe_{NB}$ and to the ratio of $CBCR_{mobile-device}$ to $CBCR_{P-GW}$. If the ratio of $CBCR_{mobile-device}$ to $CBCR_{eNB}$ is less than 1, and the ratio of $CBCR_{mobile-device}$ to $CBCR_{P-GW}$ is less than 1, then the IP endpoint 101 may infer that the mobile device's traffic is less proportionally congested at the eNodeB and the P-Gateway 102 than other mobile devices on the same enhanced node-B 103 and P-Gateway 102. If the ratio $CBCR_{mobile-device}$ to $CBCR_{eNB}$ is less than 1, and the ratio of $CBCR_{mobile-device}$, to $CBCR_{P-GW}$ is greater than 1, then the IP endpoint 101 may infer that the mobile device's traffic is more proportionally congested at the P-Gateway 102 than at the enhanced node-B 103. In such case, the IP endpoint 102 may conclude that congestion may reside towards the enhanced node-B 103. If the ratio of $CBCR_{mobile-device}$ to $CBCR_{eNB}$ is greater than 1, and the ratio of $CBCR_{mobile-device}$, to $CBCR_{P-GW}$ is less than 1, then the IP endpoint 101 may infer that the mobile device's traffic is more proportionally congested at the enhanced node-B 103 than the P-Gateway 102. In such case, the IP endpoint 101 may conclude that congestion may reside towards the P-Gateway 102. If the ratio of $CBCR_{mobile-device}$ to $CBCR_{eNB}$ is greater than 1 and the ratio of $CBCR_{mobile-device}$, to $CBCR_{P-GW}$ is greater than 1, then the IP endpoint 101 may infer that the mobile device's congestion is more proportionally congested than other mobile device's on the same enhanced node-B 103 and P-Gateway 102. Table 1 provides the inferences explained above:

TABLE 1

INFERENCES FROM MOBILE DEVICE, P-GW & ENB CBCR VALUES

| Condition | $\frac{CBCR_{mobile-device}}{CBCR_{eNB}} < 1$ | $\frac{CBCR_{mobile-device}}{CBCR_{eNB}} > 1$ |
|---|---|---|
| $\frac{CBCR_{mobile-device}}{CBCR_{P-GW}} < 1$ | Mobile device's traffic is less proportionally congested at eNB & P-GW than other mobile devices on the same eNB and P-GW. | Mobile device's traffic is more proportionally congested at eNB than P-GW. Issue may reside toward the eNB. |
| $\frac{CBCR_{mobile-device}}{CBCR_{P-GW}} > 1$ | Mobile device's traffic is more proportionally congested at P-GW than eNB. Issue may reside toward the eNB. | Mobile device's traffic is more proportionally congested than other mobile device's on the same eNB and P-GW. |

In some embodiments, a CBCR value of a network element (e.g., 102, 103) can be compared to the CBCR value of a mobile device (e.g., 104) at the particular element 102, 103. Inferences, based upon such a comparison, are shown in Table 2 below.

TABLE 2

INFERENCES FROM CBCR VALUES OF A MOBILE DEVICE AND AN ELEMENT

| Condition | Inference* |
|---|---|
| $CBCR_{Element} = 1$ | Element is congested. No need to look at mobile device congestion. |
| $\frac{CBCR_{UE\ traffic\ at\ element}}{CBCR_{Elemenet}} < 1$ | Mobile device's traffic is less proportionally congested than other traffic on element. |
| $\frac{CBCR_{UE\ traffic\ at\ element}}{CBCR_{Elemenet}} > 1$ | Mobile device's traffic is more proportionally congested than other traffic on element. The Network Operator may want to focus analysis on other mobile devices. |

Figure 3:
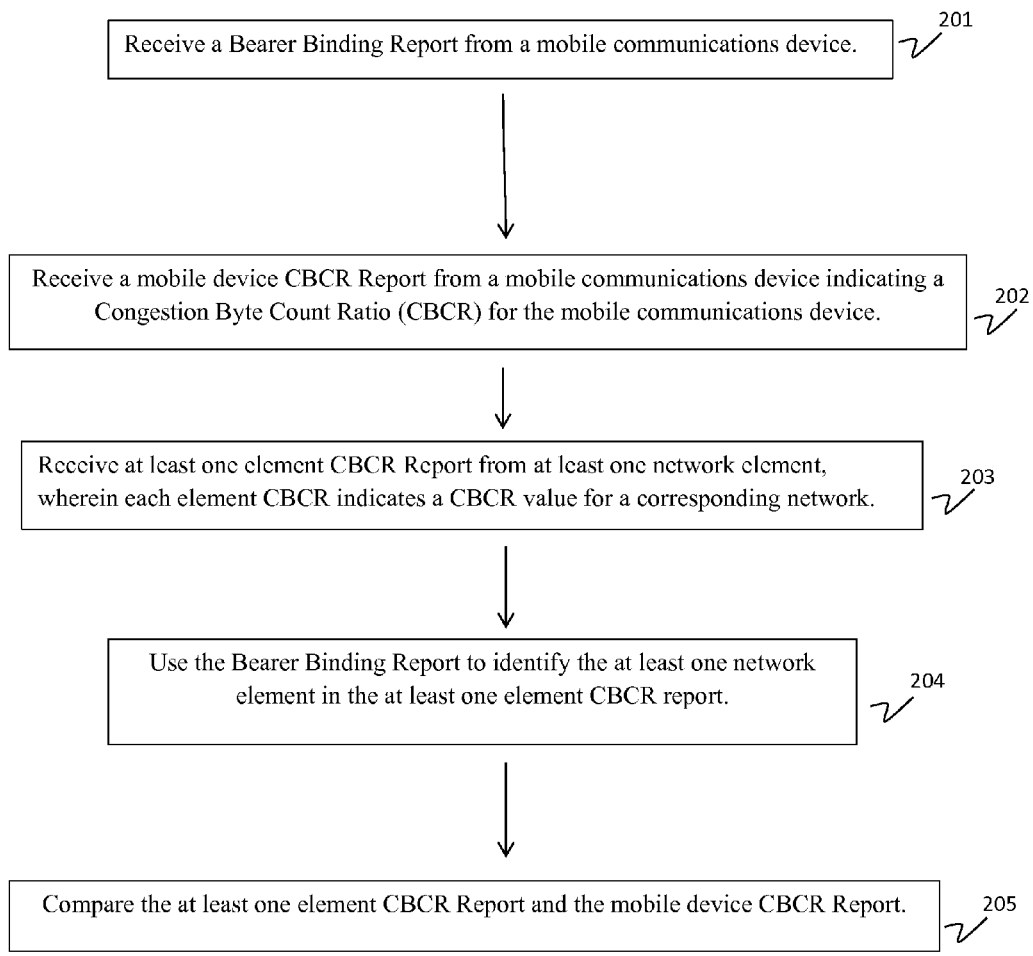
FIG. 3 is a flow chart of a method according to an embodiment of the disclosure.

Turning now to FIG. 3, disclosed is a method of evaluating, by a processor within an IP endpoint, network congestion within a network according to an embodiment. In step 201, the IP endpoint receives a Bearer Binding Report 125 from a mobile communications device, wherein the Bearer Binding Report 125 identifies at least one network element. In step 202, the IP endpoint receives a mobile device CBCR report from the mobile communications device indicating a CBCR value for the mobile communications device during an interval. In step 203, the IP endpoint receives at least one element CBCR report from the at least one network element, wherein each element CBCR indicates a CBCR value for a corresponding network element. In step 204, the IP endpoint uses the Bearer Binding Report 125 to identify the at least one network element in the at least one element CBCR Report. In step 205, IP endpoint compares the mobile device CBCR Report to the element CBCR Report.

Figure 4:
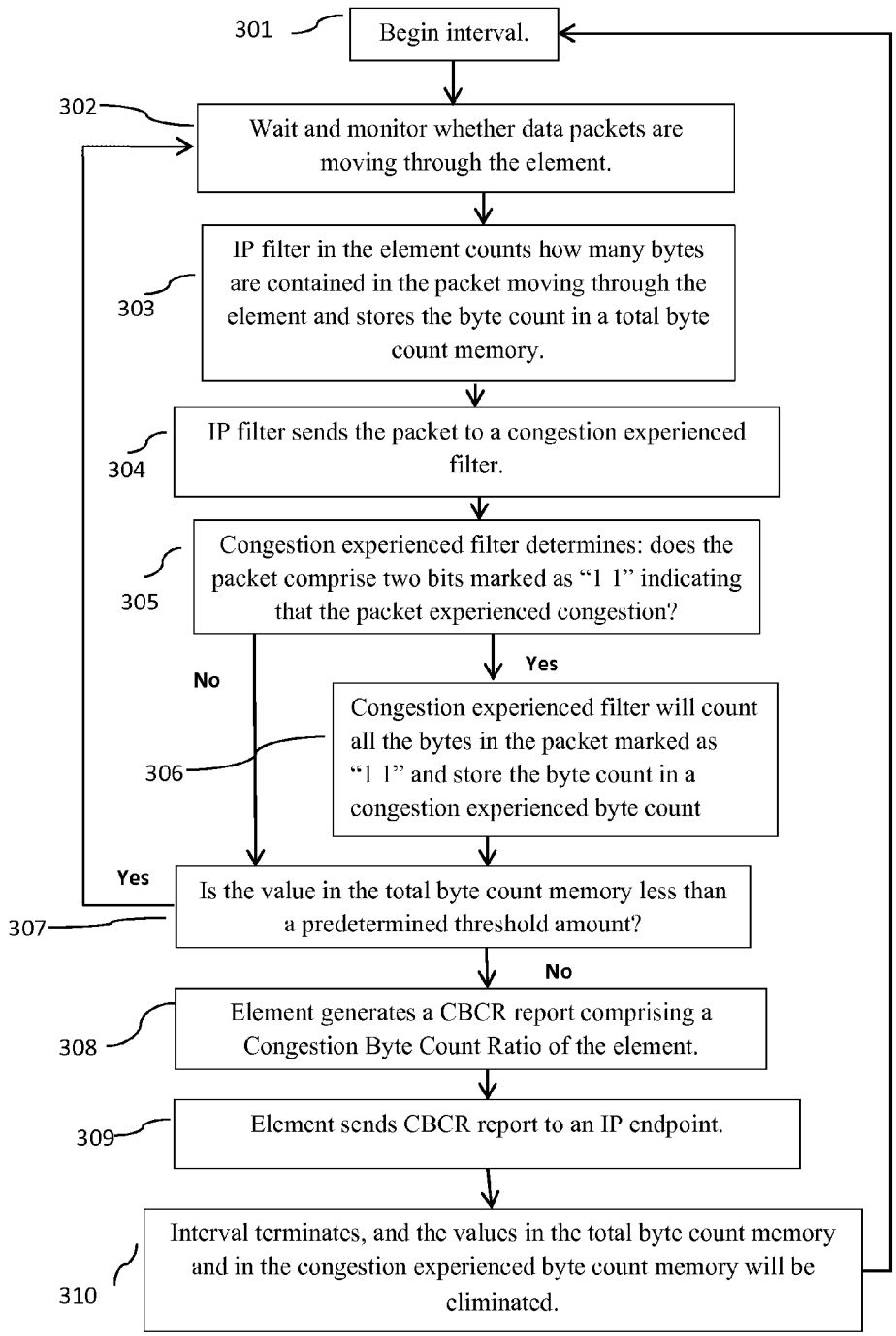
FIG. 4 is a flow chart of a method according to an embodiment of the disclosure.

Turning now to FIG. 4, disclosed is a method for generating, by an element (e.g., a network element 102, a P-gateway 103 or mobile communications device 104), a CBCR report using a packet-based interval methodology according to an embodiment. In step 301, the interval begins. In step 302, the element waits and monitors whether data packets are moving through the element. If the element does not comprise any data packets moving there through, then the element continues to wait. If the element detects a data packet moving through the element, then the element moves to step 303. In step 303, an IP filter in the element counts how many bytes are contained in the packet moving through the element and stores the byte count in a total byte count memory. In step 304, the IP filter sends the packet to a congestion experienced filter. In step 305, the congestion experienced filter determines whether the packet comprises two bits marked as "1 1" indicating that the packet experienced congestion. If the congestion experienced filter determines that the packet is not marked as experiencing congestion, then the congestion experienced filter will not count the bytes in the packet but will instead move to step 307. If, however, the congestion experienced filter determines that the packet is marked as experiencing congestion, then the congestion experienced filter will count all the bytes in the packet at step 306 and store the byte count in a congestion experienced byte count memory, and will then move to step 307. In step 307 the element looks at the value of the byte count in the total byte count memory and determines whether it is greater than or less than a predetermined threshold amount. If the total byte count is less than a predetermined threshold amount, then the process will return to step 302. If the total byte count is greater or equal to the predetermined threshold amount, then the interval will terminate and move to step 308. In step 308, the element generates a CBCR report comprising a Congestion Byte Count Ratio of the element, represented by $$CBCR_{Element} = \frac{ByteCount_{CE-marked-traffic-for-Element}}{ByteCount_{All-IP-Traffic-for-Element}}$$

wherein $ByteCount_{CE-marked-traffic-for-Element}$ is the byte count in a congestion experienced byte count memory, and $ByteCount_{All-IP-Traffic-for-Element}$ is the byte count in the total byte count memory. In step 309, the element will send the report an in IP endpoint. In step 310, the interval will terminate and the values in the total byte count memory and in the congestion experienced byte count memory will be eliminated, and the process may return to step 301 to begin a new interval.

Figure 5:
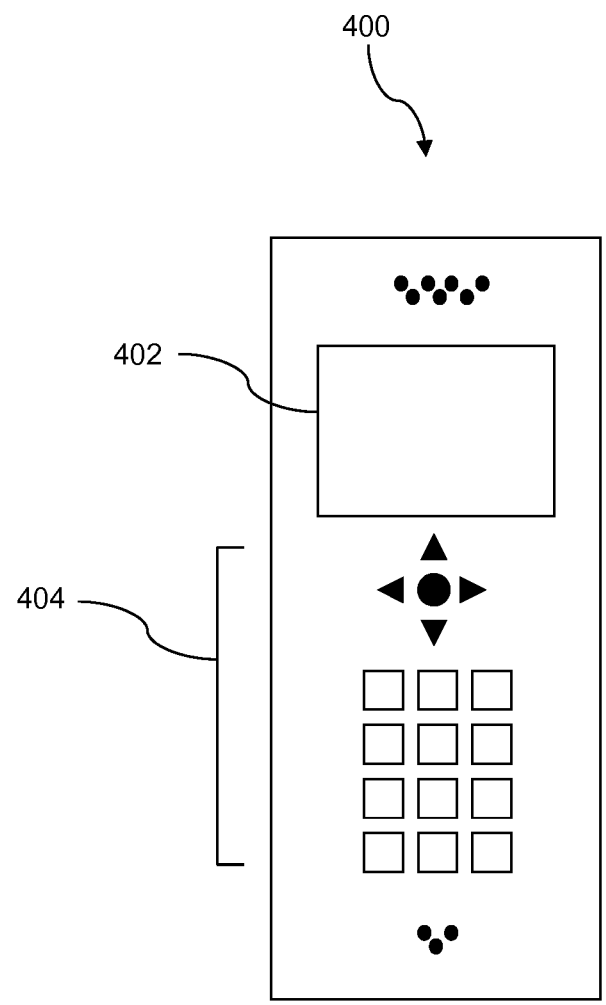
FIG. 5 is a block diagram of a mobile communication device according to an embodiment of the disclosure.

Turning now to FIG. 5, a wireless communications system including the mobile device 400 is described. FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a webpage. The webpage may be obtained via wireless communications with a base transceiver station, a wireless network access node, a peer mobile device 400 or any other wireless communication network or system.

Figure 6:
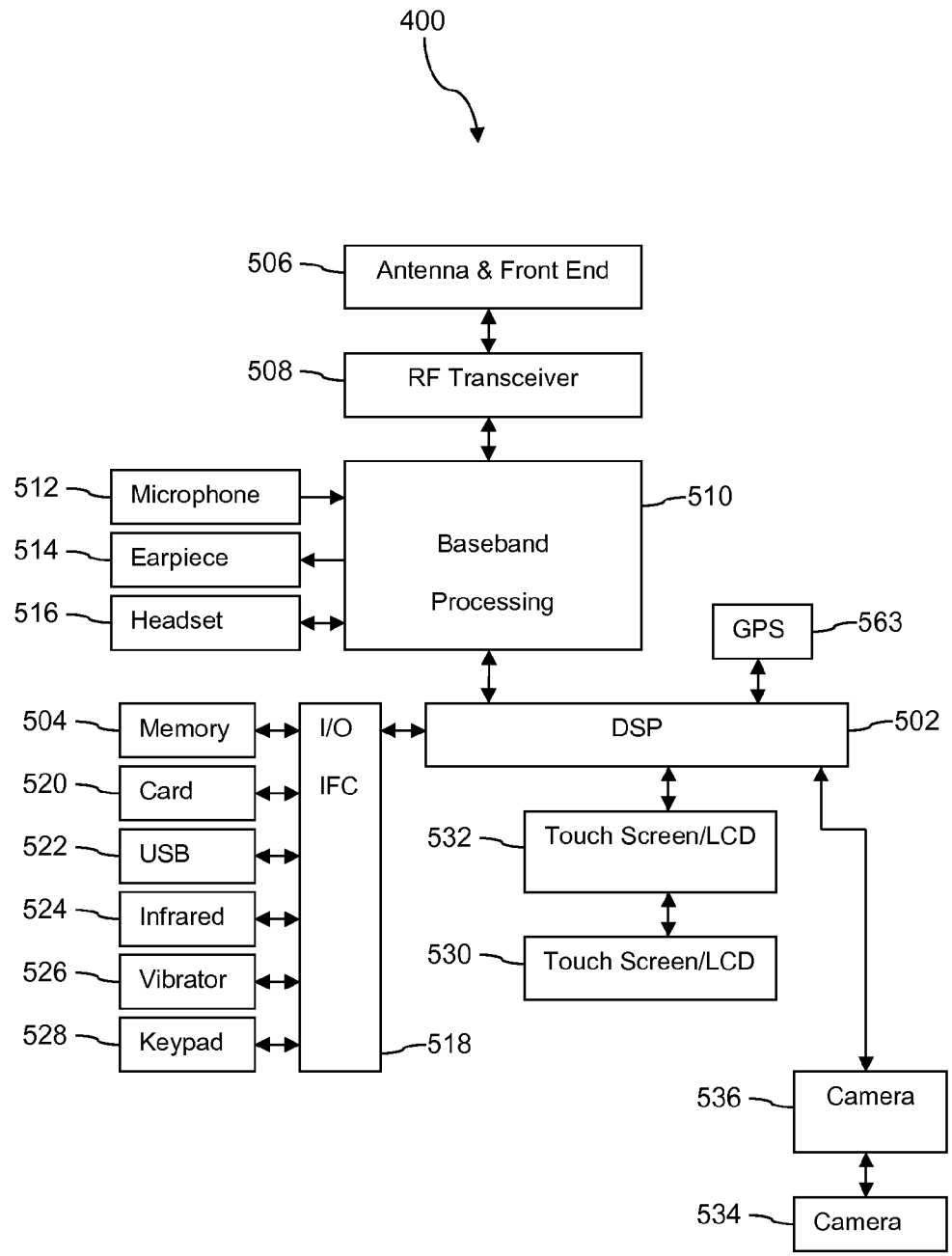
FIG. 6 is a block diagram of a mobile device according to an embodiment of the disclosure.

Turning now to FIG. 6, a block diagram of the mobile device 400 is described. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
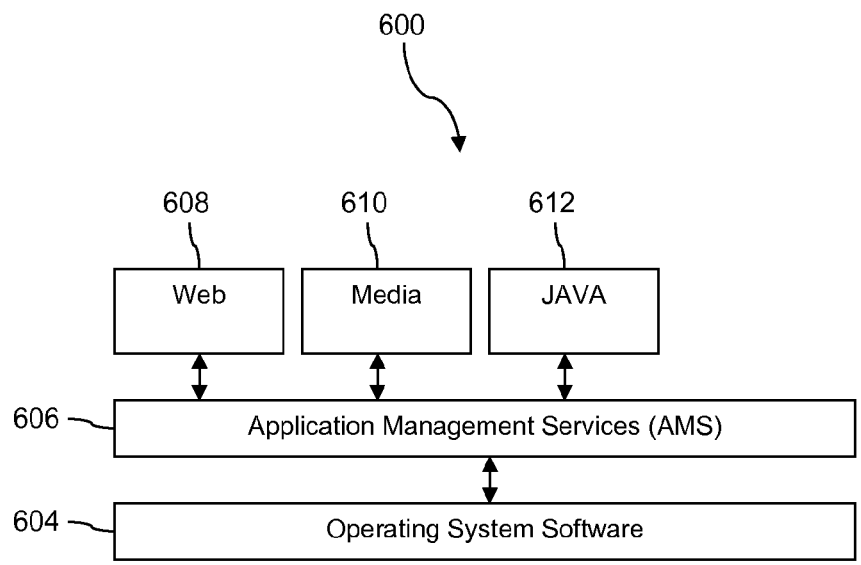
FIG. 7A is a block diagram of a software architecture of a mobile communication device according to an embodiment of the disclosure.

Turning now to FIG. 7A, a software environment 600 that may be implemented by the DSP 502 is described. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view webpages. The media player application 610 may be executed by the mobile device 400 to play audio or audiovisual media. The JAVA applets 612 may be executed by the mobile device 400 to provide a variety of functionality including games, utilities, and other functionality.

Figure 7B:
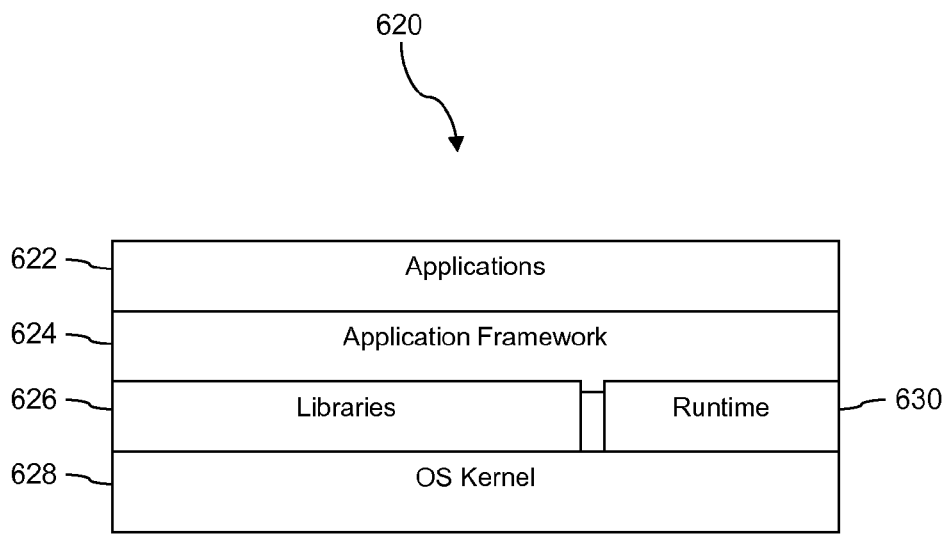
FIG. 7B is a block diagram of another software architecture of a mobile communication device according to an embodiment of the disclosure.

Turning now to FIG. 7B, an alternative software environment 620 that may be implemented by the DSP 502 is described. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
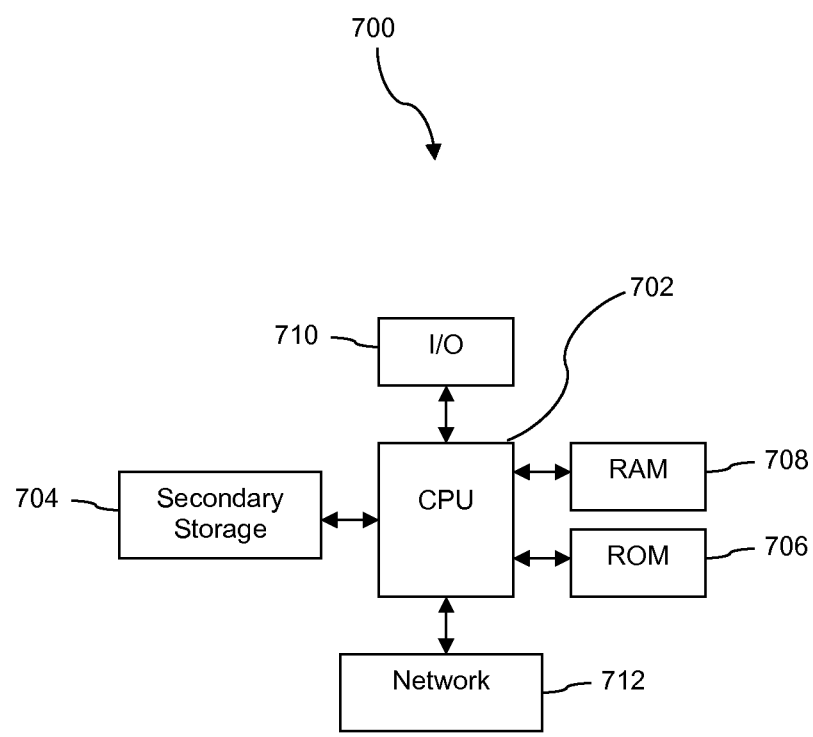
FIG. 8 is a block diagram of a computer system according to an embodiment of the disclosure.

Turning now to FIG. 8, a computer system 700 suitable for implementing one or more embodiments disclosed herein is described. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software because re-spinning a hardware implementation is more expensive than re-spinning a software design. Generally, a design that is stable and will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner that a machine controlled by a new ASIC is a particular machine or apparatus, a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if the RAM 708 is not large enough to hold all working data. The secondary storage 704 may be used to store programs which are loaded into the RAM 708 when such programs are selected for execution. The ROM 706 is used to store instructions and perhaps data which are read during program execution. The ROM 706 is a non-volatile memory device which typically has a small memory capacity relative to the larger memory capacity of the secondary storage 704. The RAM 708 is used to store volatile data and perhaps to store instructions. Access to both the ROM 706 and the RAM 708 is typically faster than to the secondary storage 704. The secondary storage 704, the RAM 708, and/or the ROM 706 may be referred to in some contexts as computer readable storage media and/or non-transitory computer readable media.

The I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using the processor 702, may be received from and outputted to the network, for example, in the form of a computer data signal embodied in a carrier wave.

Such information, which may include data or instructions to be executed using the processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk-based systems may all be considered secondary storage 704), the ROM 706, the RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708 likewise may be referred to as a non-transitory computer readable medium in that, while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An IP endpoint comprising:
    a processor;
    a memory; and
    an application stored in the memory that, when executed by the processor:
    receives from a mobile communications device a mobile device report indicating congestion experienced by data transmitted by the mobile communications device during an interval, the mobile device report being based on a Congested Byte Count Ratio for the mobile communication device $CBCR_{mobile-device}$), wherein the $CBCR_{mobile-device}$ is represented by Equation 1:

$$CBCR_{mobile-device} = \frac{ByteCount_{CE-marked-traffic-for-mobile-device}}{ByteCount_{All-IP-Traffic-for-mobile-devive}}, \quad \text{(Equation 1)}$$

and wherein $ByteCount_{CE-marked-traffic-for-mobile-device}$ is the number of bytes transmitted by the mobile communications device that experience congestion during the interval and $ByteCount_{All-IP-traffic-for-mobile-device}$ is the total number of bytes transmitted by the mobile communications device during the interval,
    receives from a network element an element report indicating congestion experienced by data transmitted by the network element during another interval, the element report being based on a Congested Byte Count Ratio for the network element ($CBCR_{element}$), wherein the $CBCR_{element}$ is represented by Equation 2:

$$CBCR_{element} = \frac{ByteCount_{CE-marked-traffic-for-element}}{ByteCount_{All-IP-Traffic-for-element}}, \quad \text{(Equation 2)}$$

and wherein $ByteCount_{CE-marked-traffic-for-element}$ is the number of bytes transmitted by the network element that experience congestion during the other interval and $ByteCount_{All-IP-traffic-for-element}$ is the total number of bytes transmitted by the network element during the other interval, and
    generates a congestion model based on the mobile device report and the element report.

2. The IP endpoint as claimed in claim 1, wherein the network element is one of an eNodeB and a P-gateway, and wherein the element report is generated and sent to the IP endpoint at the Packet or Policy Control Enforcement Function (PCEF) level (PCEF_Level).

3. The IP endpoint as claimed in claim 1, wherein the congestion model is based on a ratio of the Congested Byte Count Ratio for the mobile communications device ($CBCR_{mobile-device}$) to the Congested Byte Count Ratio for the network element ($CBCR_{element}$), represented by Ratio A:

$$\frac{CBCR_{mobile-device}}{CBCR_{element}}. \quad \text{(Ratio A)}$$

4. The IP endpoint as claimed in claim 1, wherein the IP endpoint is further configured to:
    receive from another network element a second element report indicating congestion experienced by data transmitted by the other network element during the other interval, wherein the other element report is based on a Congested Byte Count Ratio for the other network element ($CBCR_{element-II}$), wherein the $CBCR_{element-II}$ is represented by Equation 3:

$$CBCR_{element-II} = \frac{ByteCount_{CE-marked-traffic-for-element-II}}{ByteCount_{All-IP-Traffic-for-element-II}}, \quad \text{(Equation 3)}$$

wherein $ByteCount_{CE-marked-traffic-for-element-II}$ is the number of bytes transmitted by the other network element that experience during the other interval and $ByteCount_{All-IP-traffic-for-element-II}$ is the total number of bytes transmitted by the network element during the other interval; and generate a congestion model based on the mobile device report, the element report, and the second element report.

5. The IP endpoint as claimed in claim 4, wherein the congestion model is based on a ratio of the Congested Byte Count Ratio for the mobile communications device ($CBCR_{mobile-device}$) to the Congested Byte Count Ratio for the network element ($CBCR_{element}$), represented by Ratio A:

$$\frac{CBCR_{mobile-device}}{CBCR_{element}}, \quad \text{(Ratio A)}$$

and
wherein the congestion model is further based on a ratio of the Congested Byte Count Ratio for the mobile communications device ($CBCR_{mobile-device}$) to the Congested Byte Count Ratio for the second network element ($CBCR_{element-II}$), represented by Ratio B:

$$\frac{CBCR_{mobile-device}}{CBCR_{element-II}}. \quad \text{(Ratio B)}$$

6. The IP endpoint as claimed in claim 1, wherein the data transmitted by the network element comprises data transmitted to the mobile communications device and data transmitted to at least one other mobile communication device.

7. A network element comprising:
a memory;
a processor configured to transmit data from an IP endpoint to a mobile communications device; and
at least one application stored in the memory that, when executed by the processor:
counts an amount of data transmitted by the network element,
counts amount of the data marked as congestion experienced that is transmitted by the network element,
generates a report based on a total byte count and a congestion experienced byte count during an interval, wherein the report comprises a Congested Byte Count Ratio for the network element ($CBCR_{element}$) represented by Equation 2:

$$CBCR_{element} = \frac{ByteCount_{CE-marked-traffic-for-element}}{ByteCount_{All-IP-Traffic-for-element}}, \quad \text{(Equation 2)}$$

and wherein $ByteCount_{CE-marked-traffic-for-element}$ is the congestion experienced byte count during the interval and $ByteCount_{All-IP-traffic-for-element}$ is the total byte count during the interval, and send the report to the IP endpoint.

8. The network element of claim 4, wherein the processor is further configured to:

determine the total byte count representing a number of bytes transmitted by the network element during the interval, and determine the congestion experienced byte count representing a number of bytes transmitted by the network element during the interval that are marked as congestion experienced.

9. The network element of claim 8, wherein the network element comprises one of a P-Gateway and an S-Gateway.

10. The network element of claim 7, wherein data marked as congested experienced comprise a packet header including bits in the DiffServField of IPv4 or IPv6 headers marked "1 1".

11. The network element of claim 7, wherein the network element comprises an enhanced node-B.

12. The network element as claimed in claim 8, wherein the report is generated and sent to the IP endpoint at the Access Point Name (APN) Level (APN_Level) or the Packet or Policy Control Enforcement Function (PCEF) level (PCEF_Level).

13. A method for mapping network congestion in real-time, comprising:
receiving, by an IP endpoint, a mobile device report from a mobile communications device indicating congestion experienced by data transmitted by the mobile communication device during an interval, the mobile device report being based on a Congested Byte Count Ratio for the mobile communication device ($CBCR_{mobile-device}$), wherein the $CBCR_{mobile-device}$ is represented by Equation 1:

$$CBCR_{mobile-device} = \frac{ByteCount_{CE-marked-traffic-for-mobile-device}}{ByteCount_{All-IP-Traffic-for-mobile-devive}}, \quad \text{(Equation 1)}$$

and wherein $ByteCount_{CE-marked-traffic-for-mobile-device}$ is the number of bytes transmitted by the mobile communication device that experience congestion during the interval and $ByteCount_{All-IP-traffic-for-mobile-device}$ is the total number of bytes transmitted by the mobile communication device during the interval, receiving, by the IP endpoint, an element report from a network element indicating congestion experienced by data transmitted by the network element during another interval, the element report being based on a Congested Byte Count Ratio for the network element ($CBCR_{element}$), wherein the $CBCR_{element}$ is represented by Equation 2:

$$CBCR_{element} = \frac{ByteCount_{CE-marked-traffic-for-element}}{ByteCount_{All-IP-Traffic-for-element}}, \quad \text{(Equation 2)}$$

and wherein $ByteCount_{CE-marked-traffic-for-element}$ is the number of bytes transmitted by the network element that experience congestion during the other interval and $ByteCount_{All-IP-traffic-for-element}$ is the total number of bytes transmitted by the network element during the other interval, mapping a network congestion model based on the mobile device report and the element report, and rerouting a data transmission towards the network element or away from the network element, based on the network congestion model.

14. The IP endpoint as claimed in claim 13, wherein the network element comprises one of an enhanced node-B and a gateway, and wherein the element report is generated and sent to the IP endpoint at the Packet or Policy Control Enforcement Function (PCEF) level (PCEF_Level).

15. The method of claim 13, wherein the data transmitted by the network element comprises data transmitted to the mobile communication device and data transmitted to at least one other mobile communication device.

16. The method of claim 13, wherein the IP endpoint receives the network element report at the Access Point Name (APN) Level (APN_Level) or the Packet or Policy Control Enforcement Function (PCEF) level (PCEF_Level).

* * * * *